(12) United States Patent
Liu et al.

(10) Patent No.: US 8,484,273 B1
(45) Date of Patent: *Jul. 9, 2013

(54) PROCESSING SYSTEM AND METHOD FOR TRANSFORM

(75) Inventors: Peter Tze-Hwa Liu, Alameda, CA (US); Pak Hei Matthew Leung, Hong Kong (HK); Hungming Chang, Sunnyvale, CA (US); Jacky S. Chow, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 781 days.

This patent is subject to a terminal disclaimer.

(21) Appl. No.: 12/719,340

(22) Filed: Mar. 8, 2010

Related U.S. Application Data

(63) Continuation of application No. 11/324,933, filed on Jan. 4, 2006, now Pat. No. 7,676,532.

(60) Provisional application No. 60/704,635, filed on Aug. 2, 2005.

(51) Int. Cl.
*G06F 17/14* (2006.01)

(52) U.S. Cl.
USPC ........................................................ 708/400

(58) Field of Classification Search
USPC ................................................ 708/400–410
See application file for complete search history.

(56) References Cited

U.S. PATENT DOCUMENTS

| 7,395,293 | B1 | 7/2008 | Szedo et al. |
| 7,543,010 | B2 | 6/2009 | Swartzlander et al. |

OTHER PUBLICATIONS

DSP in PMS-TC+PMD for DMT-VDSL; Fernando Ramirez-Mireles; Ikanos Communications; Jan. 17, 2003; p. 33.
Fast Fourier transform; Wikipedia; Oct. 14, 2005; 5 pages.
Chapter 11 Fast Fourier transform (FFT); B. Champagne & F. Labeau, Nov. 16, 2004; pp. 219-229.
Fast Fourier Transfor (FFT); www.cmlab.csie.ntu.edu.tw/cml; Oct. 14, 2005; 12 pages.
The Radix 2 Decimation in Time (DIT) Algorithm; www.eptools.com/tn/Tooo1/PT04.htm; Oct. 31, 2005; 6 pages.
FFT of Pure Real Sequences; www.eptools.com/tn/Tooo1/PT10.htm; Oct. 24, 2005; 6 pages.
Mixed Radix algorthms; www.eptools.com/tn/T0001/PT07.htm; Oct. 24, 2005; 6 pages.
DIF and DIT Decomposition Revisited; www.eptools.com/tn/T0001/PT08.htm; Oct. 24, 2005; 4 pages.
Third Edition, Digital Signal Processing Principles, Algorithms, and Applications, pp. 474-479.

*Primary Examiner* — Tan V. Mai

(57) ABSTRACT

A transform calculator includes a plurality of memories. A memory mapping rules module is configured to apportion points of a discrete time domain sequence among the plurality of memories. A pipelined data path is configured to iteratively process pairs of the points of the discrete time domain sequence received from the plurality of memories. A control module is configured to select the pairs of the points in the plurality of memories for processing by the pipelined data path, wherein only one point of each of the pairs of the points is selected at a given time.

19 Claims, 7 Drawing Sheets

PROCESSING SYSTEM AND METHOD FOR TRANSFORM

CROSS-REFERENCE TO RELATED APPLICATIONS

This application is a continuation of U.S. patent application Ser. No. 11/324,933, filed Jan. 4, 2006, which claims the benefit of U.S. Provisional Application No. 60/704,635, filed Aug. 2, 2005, which are incorporated herein by reference in their entirety.

FIELD OF THE INVENTION

The present invention relates to a processing system and method for a transform, and more particularly to a processing system and method for a Fast Fourier Transform.

BACKGROUND OF THE INVENTION

The Discrete Fourier Transform (DFT) transforms a discrete time-domain sequence of finite length into a discrete set of frequency values. The DFT of an N-point sequence x(n) is $$X(k) = \sum_{n=0}^{N-1} x(n) W_N^{kn}$$

for k=0, 1, ... N−1. $W_N$, often referred to as a twiddle factor, is shorthand notation for $e^{-j2\pi/N}$. The inverse DFT (IDFT) relation is identical to the DFT relation scaled by a constant and with the sign of the exponent reversed:

$$x(n) = \frac{1}{N} \sum_{k=0}^{N-1} X(k) W_N^{-kn}$$

for n=0, 1, ... N−1. Therefore, techniques developed for the DFT apply with minimal adaptation to the IDFT.

The DFT is capable of handling complex x(n), in which case the DFT will transform N (or fewer) complex time-domain inputs into N complex frequency-domain outputs. Because $W_N$ is complex, the X(k) generated by the DFT are often complex, even when the input sequence x(n) is real. If the DFT of a sequence of length 2N is desired, a 2N-point DFT can be used. If the 2N-point sequence is real, however, it seems intuitively possible to arrange pairs of the 2N real inputs to make N complex inputs. This N-point complex input can then be processed with an N-point DFT. This technique will be useful if the 2N-point DFT can be extracted from this N-point DFT.

If a sequence containing 2N real values is denoted g(n), two N-point real sequences can be formed from g(n). These N-point sequences may contain the even and odd points of g(n), respectively: e.g., $x_1(n) = g(2n)$ and $x_2(n) = g(2n+1)$. These two sequences can be combined into a single complex sequence of length N by assigning $x_1(n)$ as the real part and $x_2(n)$ as the imaginary part: i.e., $x(n) = (n) + jx_2(n)$. The 2N-point real sequences can be expressed in terms of the combined sequence as follows:

$$x_1(n) = \frac{1}{2}[x(n) + x*(n)] \text{ and } x_2(n) = \frac{1}{2j}[x(n) - x*(n)]$$

The DFT is a linear relation, so:

$$X_1(k) = \frac{1}{2}[DFT(x(n)) + DFT(x*(n))]$$

and $$X_2(k) = \frac{1}{2j}[DFT(x(n)) - DFT(x*(n))].$$

Symmetry of the DFT means that:

$$X_1(k) = \frac{1}{2}[X(k) + X*(N-k)] \text{ and } X_2(k) = \frac{1}{2j}[X(k) - X*(N-k)].$$

The desired output is the DFT G(k) of the original 2N input sequence g(n). The definition of the DFT can be used to reconstruct G(k), where $$G(k) = \sum_{n=0}^{2N-1} g(n) W_{2N}^{kn} = \sum_{n=0}^{N-1} g(2n) W_{2N}^{2kn} + \sum_{n=0}^{N-1} g(2n+1) W_{2N}^{k(2n+1)} =$$

$$\sum_{n=0}^{N-1} x_1(n) W_N^{kn} + W_{2N}^k \sum_{n=0}^{N-1} x_2(n) W_N^{nk} = X_1(k) + W_{2N}^k X_2(k) =$$

$$\frac{1}{2}(\{X(k) + X*(N-k)\} - jW_{2N}^k\{X(k) - X*(N-k)\}) \text{ for } k =$$

$$0, 1, \ldots, N-1$$

The DFT of a real sequence is Hermitian symmetric:

$$G(2N-k)^* = \left[\sum_{n=0}^{2N-1} g(n) W_{2N}^{(2N-k)n}\right]^* =$$

$$W_{2N}^{2Nn}\left[\sum_{n=0}^{2N-1} g(n) W_{2N}^{-kn}\right]^* = \sum_{n=0}^{2N-1} [g(n)]^*[W_{2N}^{-kn}]^* = \sum_{n=0}^{2N-1} g(n) W_{2N}^{kn} = G(k)$$

Therefore, once the first N points are calculated, the next N are simply the complex conjugates of the first N in reverse order. Interleaving real g(n) into a complex sequence x(n) may be accomplished by the way in which g(n) is initially stored in memory. For example, g(n) may be stored in memory sequentially, and complex numbers may be read as alternating real and imaginary parts. Calculation is therefore divided into two steps: the DFT and post-processing. A computational reduction of approximately two times is achieved in the DFT step by using an N-point DFT instead of a 2N-point DFT, a savings that becomes more significant as N increases.

Figure 1:
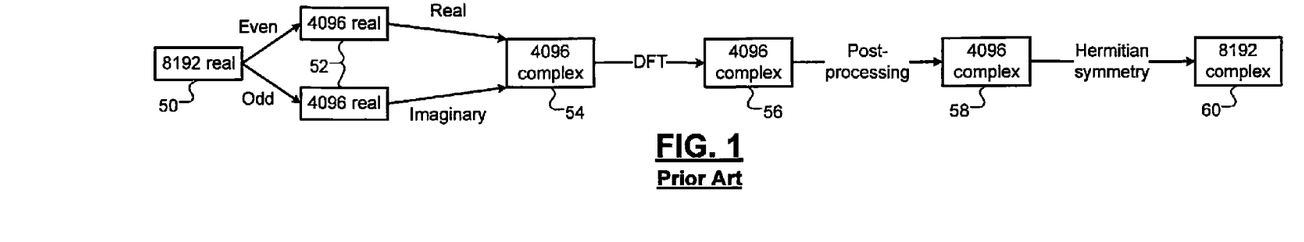
FIG. 1 is a data flow diagram for calculating a DFT of a 2N-point real sequence using an N-point DFT.

This technique is discussed in John G. Proakis & Dimitris G. Manolakis, Digital Signal Processing: Principles, Algorithms, and Applications §6.2.2 (3d ed. 1996), which is hereby incorporated by reference in its entirety. Referring now to FIG. 1, the flow of data is summarized for an exemplary sequence length. An 8192-point real sequence 50 is split into two 4096-point real sequences 52 consisting of the even and odd values of the original sequence 50. The even and odd real sequences form the real and imaginary parts, respectively, of a 4096-point complex sequence 54. A 4096-point DFT transforms the complex sequence 54 into a 4096-point frequency domain sequence 56. Post-processing creates a new 4096-point sequence 58. Hermitian symmetry dictates what the next 4096 points are, to allow generation of a 8192-point complex sequence 60.

The technique is equally applicable when calculating the IDFT of a 2N-point frequency domain sequence G(k) that is Hermitian symmetric (corresponding to a real time-domain sequence). This is the case in VDSL (Very high bit-rate Digital Subscriber Line) applications. In this situation, the calculation steps are pre-processing and IDFT calculation. Pre-processing involves calculating $$X_1(k) = \frac{1}{2}[G(k) + G(N-k)^*] \text{ and } X_2(k) = \frac{1}{2}[G(k) - G(N-k)^*]e^{j2\pi k/N}$$

from the first N points of G(k) (the next N points add no information, as they are simply conjugates of the first N according to Hermitian symmetry). The sequence upon which the IDFT is performed is $X(k)=(k)+jX_2(k)$, and the resulting sequence x(n) will contain the even samples $x_1(n)$ as the real parts, and the odd samples $x_2(n)$ as the imaginary parts.

Figure 2:
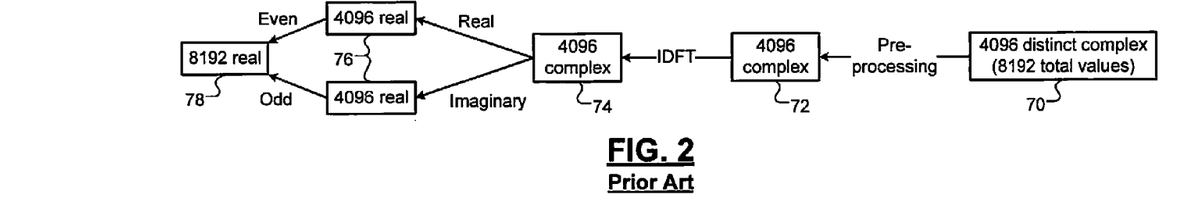
FIG. 2 is a data flow diagram for calculating an IDFT of a 2N-point Hermitian symmetric sequence using an N-point IDFT.

Referring now to FIG. 2, a data flow summary of this inverse process is depicted. A 4096-point complex sequence 70 (although Hermitian symmetry dictates the other 4096 points of a 8192-point sequence) is pre-processed to another 4096-point complex sequence 72. An IDFT transforms the sequence 72 into a 4096-point complex sequence 74. The real and imaginary parts 76 of the complex sequence 74 are the even and odd values, respectively, of an 8192-point real sequence 78.

Figure 3:
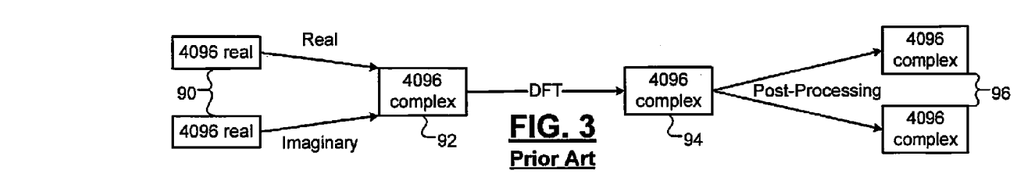
FIG. 3 is a data flow diagram for calculating a DFT of 2 N-point real sequences using an N-point DFT.

Referring now to FIG. 3, a data flow summary of a similar technique is depicted. In this case, the DFT of two real sequences is desired. The two 4096-point real sequences 90 form the real and imaginary parts of a 4096-point complex sequence 92. A DFT transforms the sequence 92 into another 4096-point complex sequence 94. Post-processing extracts two 4096-point complex sequences 96 from the sequence 94. The sequences 96 are the DFTs of the respective sequences 90.

Figure 4:
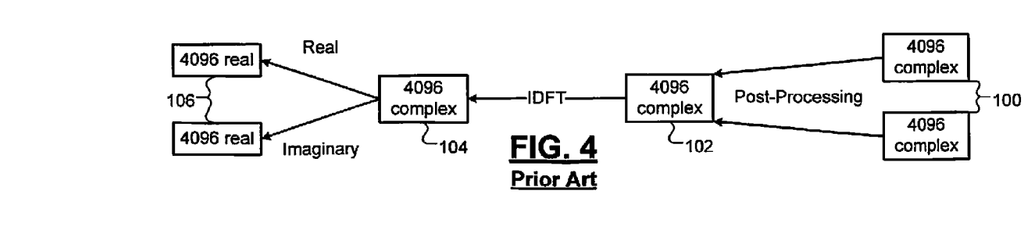
FIG. 4 is a data flow diagram for calculating an IDFT of 2 N-point Hermitian symmetric sequences using an N-point IDFT.

Referring now to FIG. 4, a data flow summary of the process inverse to that of FIG. 3 is shown. Two 4096-point complex sequences 100 are added (multiplying the second sequence 100 by j) to create a 4096-point complex sequence 102. An IDFT transforms the sequence 102 into a 4096-point complex sequence 104. The real and imaginary parts of the sequence 104 are the respective values of two 4096-point real sequences 106. The sequences 106 correspond to the IDFTs of the sequences 100.

The DFT can be evaluated directly according to its definition, $$X(k) = \sum_{n=0}^{N-1} x(n) W_N^{kn}.$$

Due to the DFT's importance, many techniques have been developed that speed this process. These techniques are generally labeled Fast Fourier Transforms (FFT), and have complementary Inverse FFTs (IFFT). The above technique for obtaining a 2N-point DFT sequence using only an N-point DFT is equally applicable when an FFT is used to calculate the DFT.

One popular FFT methodology is referred to as divide-and-conquer. For N=L*M, the divide-and-conquer FFT will calculate L M-point DFTs and combine the L DFTs into a single DFT. For example, if M is 2, L 2-point DFTs can be calculated. If N is a power of 2, this division can be repeated $\log_2$ N times. This FFT is known as Radix-2. If N is a power of 4, a Radix-4 FFT can be used. The Radix-4 FFT is more complex to implement, but for large N, its reduction in computation time is worth the trade-off. Because an input sequence can be zero-padded up to a length of a power of 2 or 4, Radix-2 and Radix-4 can be used for any input sequence.

SUMMARY OF THE INVENTION

A system comprises M memories, wherein a first mapping assigns each point of an N-point input sequence to one of the M memories. A pipelined data path receives an input from each of the M memories, stores an output to each of the M memories, and iteratively processes pairs of points of the N-point input sequence. A control module designates the pairs of points from the M memories for processing by the data path, wherein only one point of each of the pairs is designated at one time.

In other features, M is four. The data path receives M inputs at approximately the same time and stores M outputs at approximately the same time. The data path stores the outputs to locations in the M memories where corresponding inputs were received from. The mapping assigns an equal number of points of the N-point input sequence to each of the M memories. M is 4, each address of the points of the N-point input sequence contains L 2-bit quartets. The mapping comprises summing the L quartets modulo 4. The sum selects one of the M memories.

In other features, the control module also directs calculation of a transform on the N-point input sequence. The data path performs the calculation of the transform. The transform includes a Fast Fourier Transform. The Fast Fourier Transform is performed before the processing. The Fast Fourier Transform comprises a Radix-4 technique. The transform includes an inverse Fast Fourier Transform. The inverse Fast Fourier Transform is performed after the processing. The inverse Fast Fourier Transform comprises a Radix-4 technique.

In other features, the pairs of points each comprise a first point and a second point. The control module designates a first point of a first pair of the pairs of points while designating a second point of a second pair of the pairs of points. The data path includes a complex multiplier that is time-shared between a portion of the data path employing the first pair and a portion of the data path employing the second pair. The M memories store the N-point input sequence as N complex values.

In other features, a computer method stored on a computer-readable medium comprises mapping each point of an N-point input sequence to one of M memories; receiving an input from each of the M memories and storing an output to each of the M memories; iteratively processing pairs of points of the N-point input sequence; and designating the pairs of points from the M memories for processing by the data path, wherein only one point of each of the pairs is designated at one time.

In other features, M is four. The method further includes receiving M inputs at approximately the same time and storing M outputs at approximately the same time. The method further includes storing the outputs to locations in the M memories where corresponding inputs were received from. The mapping assigns an equal number of points of the N-point input sequence to each of the M memories. M is 4, each address of the points of the N-point input sequence contains L 2-bit quartets. The method further comprises summing the L quartets modulo 4, wherein the sum selecting one of the M memories.

In other features, the method further includes directing calculation of a transform on the N-point input sequence. The method further includes performing the calculation of the transform. The transform includes a Fast Fourier Transform. The method further includes performing the Fast Fourier Transform before the processing. The Fast Fourier Transform comprises a Radix-4 technique. The transform includes an inverse Fast Fourier Transform. The inverse Fast Fourier Transform is performed after the processing. The inverse Fast Fourier Transform comprises a Radix-4 technique. The pairs of points each comprise a first point and a second point. The method further comprises designating a first point of a first pair of the pairs of points while designating a second point of a second pair of the pairs of points. The method further includes time sharing a complex multiplier between a portion of the data path employing the first pair and a portion of the data path employing the second pair. The method further includes storing the N-point input sequence as N complex values in the M memories.

In still other features, the methods described above are implemented by a computer program executed by one or more processors. The computer program can reside on a computer readable medium such as but not limited to memory, non-volatile data storage and/or other suitable tangible storage mediums.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

When Radix-4 is implemented in hardware, storage is often divided into four banks. This storage can be accomplished in a number of ways (e.g., registers, Random Access Memory, etc.), but for convenience will be referred to herein as RAM. Each Radix-4 iteration (called a "butterfly" because of its directed graph representation) uses 4 inputs and generates 4 outputs. Replacing the RAM locations of the inputs with the outputs is referred to as in-place computation. Because 4 inputs/outputs are needed, Radix-4 lends itself to having RAM separated into four banks. If a mapping from address to RAM bank can be found so that each of the 4 inputs is taken from a different RAM bank, the 4 inputs can be read simultaneously, one from each bank. The 4 outputs can then also be simultaneously written back into their respective banks.

Figure 5:
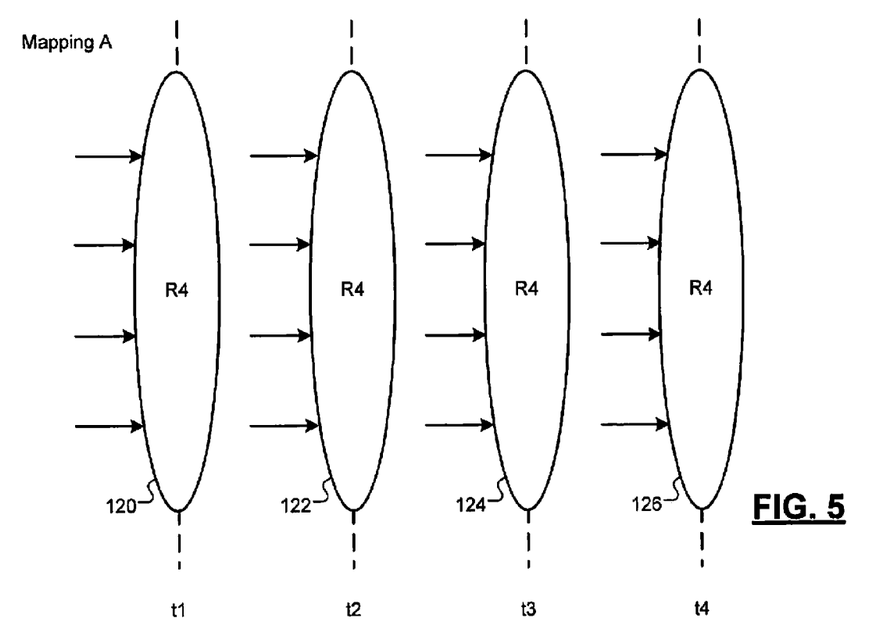
FIG. 5 is a graphical depiction of a Radix-4 pipeline flow using a first mapping.

Such a mapping, which will be called Mapping A, allows the pipelined flow depicted in FIG. 5. At time t1, calculation of the first Radix-4 butterfly 120 is begun by reading four inputs, one each from the four banks. At time t2, another four inputs are read to compute the next Radix-4 butterfly 122. This process continues at time t3 for butterfly 124, time t4 for butterfly 126, and so on.

One of the many possible choices for Mapping A uses a modulo 4 sum of the "quartets" of the RAM address. Performing a 4096-point FFT means that 12 bits of address are needed to identify the 4096 points ($2^{12}=4096$). The twelve address bits ($b_{11}b_{10}b_9b_8b_7b_6b_5b_4b_3b_2b_1b_0$) can be grouped into quartets, where each quartet contains two bits. The twelve-bit address is now a six-quartet address, $q_5q_4q_3q_2q_1q_0$, where $q_5=b_{11}b_{10}$, $q_4=b_9b_8$, etc. The most-significant quartets $q_5q_4q_3q_2q_1$, are used as the address within the RAM bank, and the bank is selected by the expression $(q_5+q_4+q_3+q_2+q_1+q_0) \bmod 4$.

As discussed in the background, when performing an N-point DFT (or IDFT) for a 2N-point real sequence, post-processing (or pre-processing) must be performed. This processing can use the same values from the same RAM banks that are used by the Radix-4 FFT. Processing (whether pre or post) pairs point k with point N-k for each desired value; for example, with N=4096, point 1 is paired with point 4095, point 2 with point 4094, etc. The pipeline diagram of FIG. 6 demonstrates how two values are read for each of two processing steps 130 and 132 at time t1. A total of four values are read at time t2, for processing steps 134 and 136. This process continues with steps 138, 140, 142, 144, etc.

Figure 6:
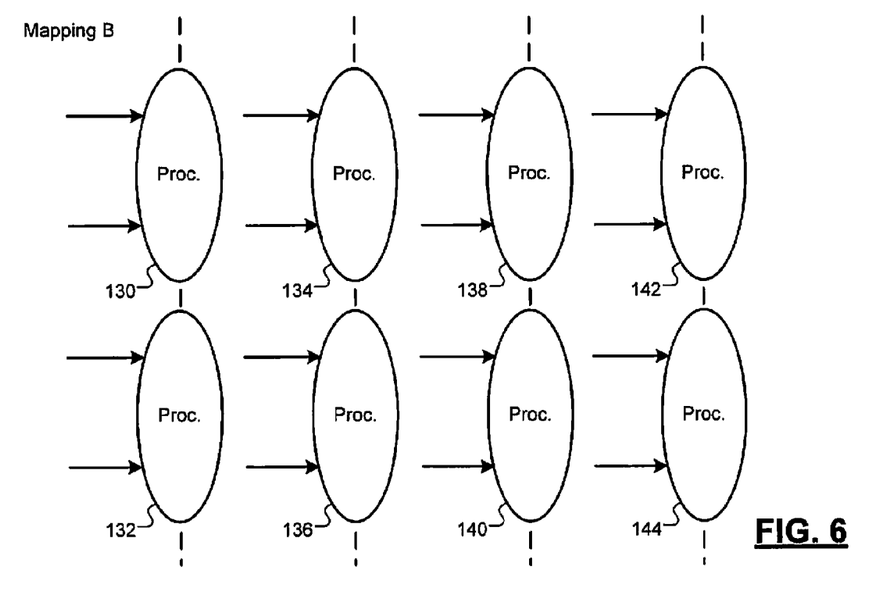
FIG. 6 is a graphical depiction of a processing pipeline flow using a second mapping.
Figure 7:
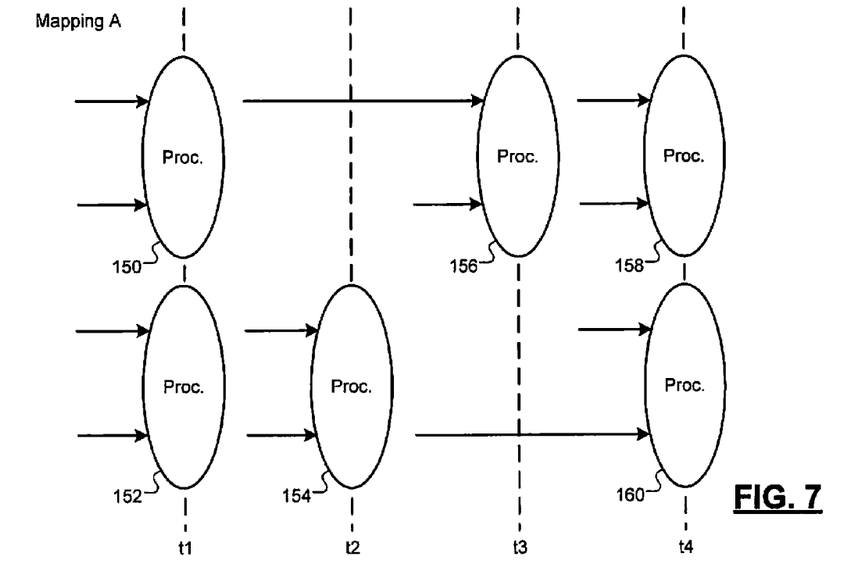
FIG. 7 is a graphical depiction of a processing pipeline flow using the first mapping.

FIG. 6 assumes that a mapping, which will be called Mapping B, exists whereby the four inputs needed at each time interval are taken from different banks. Otherwise, the pipeline will stall, as two values must be read successively from the same RAM bank. This situation is depicted in FIG. 7. In FIG. 7, Mapping A is used, which causes some RAM accesses to collide. Processing steps 150, 152, and 154 proceed normally. Processing step 156, however, needs two values from the same RAM bank, causing step 156 to be delayed. Step 158 proceeds normally, while step 160 is delayed by a double access to a single RAM bank.

Clearly, Mapping A, while allowing for perfect pipelining of Radix-4 (as shown in FIG. 5), does not work well for processing (as shown in FIG. 7). Mapping B works well for processing in FIG. 6, but causes collisions when performing Radix-4 (a broken pipeline similar to FIG. 7 is not shown). A Mapping C that caused no collisions for processing or for Radix-4 would be ideal. Unfortunately, no such Mapping C has been found.

Processing and Radix-4 stages operate at distinct periods of time-Radix-4 followed by post-processing (as for FFT), or pre-processing followed by Radix-4 (as for IFFT). It is therefore possible for a calculation system to switch between two RAM mappings, one for each phase of calculation. However, the data located in RAM after Radix-4 (or after processing, whichever occurs first) would have to be read from the RAM banks and replaced according to the new bank mapping. This would take a relatively long amount of time, with a concomitant increase in power consumption for accessing the RAM banks.

Figure 8:
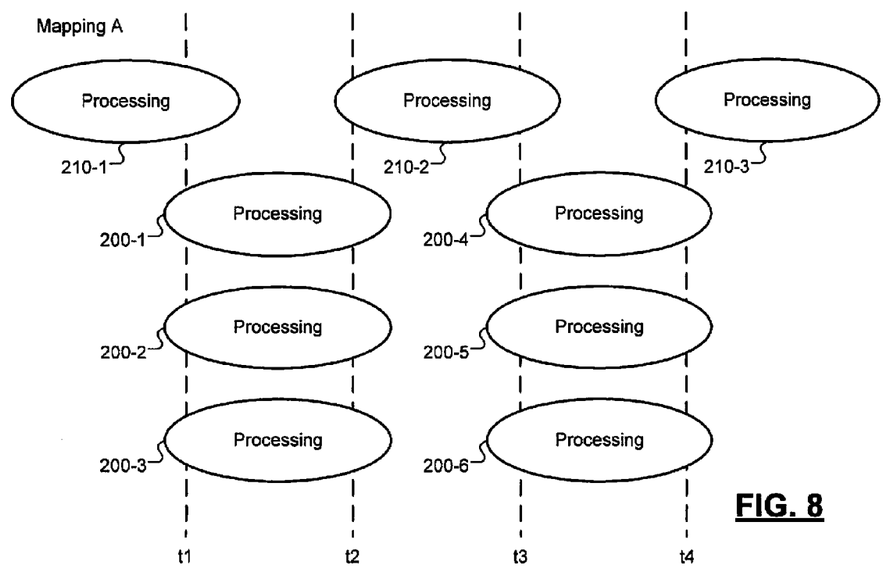
FIG. 8 is a graphical depiction of an alternative processing pipeline flow using the first mapping.

An alternate pipelining process, depicted in FIG. 8, allows processing to be perfectly pipelined using the same Mapping A that works for Radix-4. Processing steps 200 are "rotated" by 90 degrees from the implementation of FIG. 6. Processing steps 210 are "rotated" by 270 degrees from the implementation of FIG. 6 for resource-sharing reasons that will be explained below. Steps 200-1, 200-2, and 200-3 each retrieve a value (the first of the pair) from a corresponding RAM bank at time t1. Simultaneously, step 210-1 retrieves a value from a fourth RAM bank, and begins processing. At time t2, steps 200-1, 200-2, and 200-3 each retrieve a value (the second of the pair) from a corresponding RAM bank and begin processing. Meanwhile, step 210-2 retrieves a value from a fourth RAM bank.

This procedure continues at time t3, where steps 200-4, 200-5, and 200-6 each retrieve a single value, and step 210-2 retrieves a single value and begins processing. In time t4, steps 200-4, 200-5, and 200-6 each retrieve another single value, and begin processing. Step 210-3 simultaneously retrieves a single value. This procedure repeats until all values are processed.

For the example of N=4096, the pipelining of FIG. 8 can be demonstrated:

| Time | 0, | 1, | 2, | 3, | 4, | ... |
|---|---|---|---|---|---|---|
| P0 | 0) | (4092, | 4) | (4088, | 8) | (... |
| P1 | (1, | 4095,) | (5, | 4091) | (9, | ... |
| P2 | (2, | 4094,) | (6, | 4090,) | (10, | ... |
| P3 | (3, | 4093,) | (7, | 4089,) | (11, | ... |

For instance, at time 1, values 4092, 4093, 4094, and 4095 are read from RAM. These addresses share the five most significant quartets and differ only in the least significant quartet. Accordingly, each value is assigned (due to the modulo four operation) to a different RAM bank. This is true for every time value, as times 0, 2, 3, and 4 illustrate.

Each iteration of Radix-4 computation ("butterfly") multiplies each of the four inputs by a respective complex "twiddle factor". One of these twiddle factors is unitary, so only three complex multiplications are required. To compute the butterfly quickly, three multipliers are used to perform the multiplications simultaneously. As mentioned above, the Radix-4 stage and the processing stage occur at different periods of time. The three multipliers used in Radix-4 can therefore be used in processing.

Figure 9:
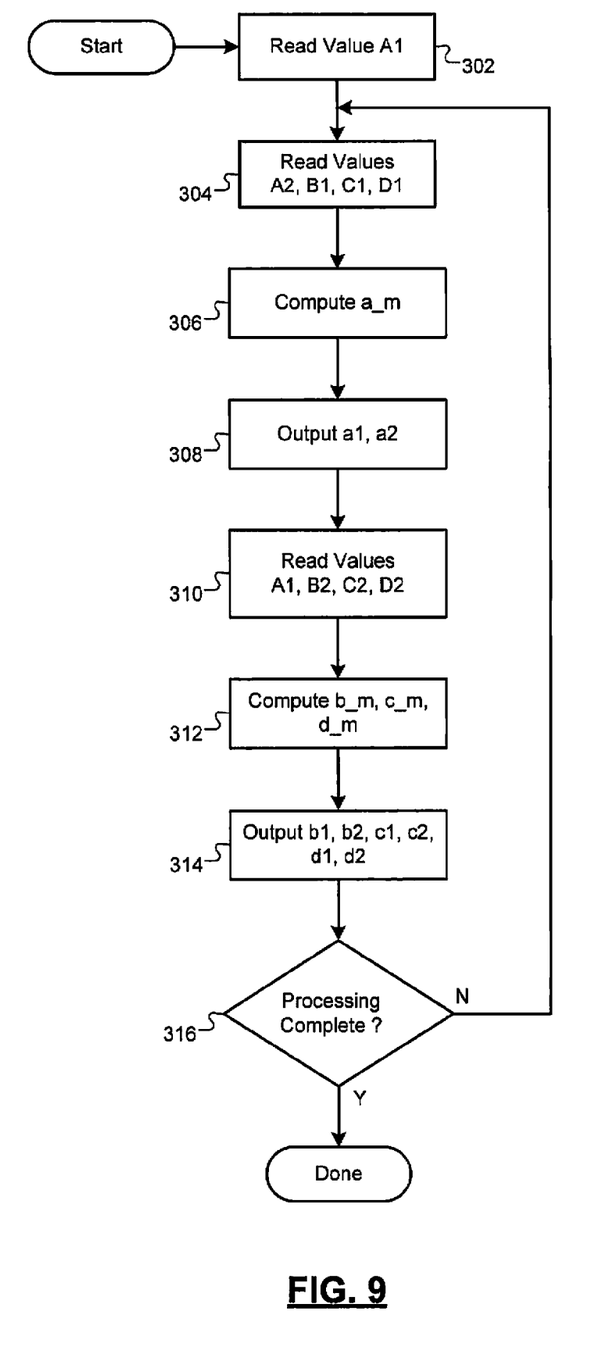
FIG. 9 is a flowchart depicting exemplary steps performed by a control module in processing a sequence before or after the transform.

Referring now to FIG. 9, a flowchart depicts exemplary steps performed to complete processing (whether pre- or post-). In this pipelined implementation, there are four paths, labeled A, B, C, and D. In actual hardware implementations, the exemplary steps may overlap, as opposed to occurring in the orderly pattern depicted in FIG. 9. Path A corresponds to the differentially rotated steps 210 of FIG. 8, while paths B, C, and D correspond to the steps 200 of FIG. 8. As will become clear, the steps 210 are rotated to use one of the three multipliers at a different time than when the steps 200 need the multipliers. In this way, the three multipliers already present for Radix-4 are sufficient, and a fourth does not need to be added.

Control begins in step 302, where a first value is read for path A, the value being referred to as A1. Control continues in step 304, where a second value is read for path A (A2), and first values are read for paths B, C, and D (B1, C1, and D1, respectively). In step 306, a complex multiplier is used with A1 and A2, yielding the value a_m. In step 308, a_m is used to generate two outputs, a1 and a2. In step 310, second values for paths B, C, and D (B2, C2, and D2) are read. Simultaneously, a new first value for path A is read (A1). In step 312, three multipliers are used to generate b_m, c_m, and d_m. In step 314, b_m, c_m, and d_m are used to generate two outputs per path: b1, b2, c1, c2, d1, and d2. In step 316, if points remain to be processed, control returns to step 304; otherwise, control ends.

To demonstrate a possible pipeline implementation, two paths (A and B) are illustrated below. The second pairs of inputs and outputs are labeled with an asterisk to differentiate them from the first pairs. For example, the inputs may be: Path A—(A1, A2), (A1*, A2*), ... and Path B—(B1, B2), (B1*, B2*), ... The outputs will be labeled as follows: Path A—(a1, a2), (a1*, a2*), ... and Path B—(b1, b2), (b1*, b2*), ... A delayed version of the inputs is used to simultaneously present the pair of inputs for calculation.

| Time stamp | 1, | 2, | 3, | 4, | 5, | 6, | 7, ... |
|---|---|---|---|---|---|---|---|
| Input_A | A1, | A2, | A1*, | A2*, ... | | | |
| Input_A_delayed | | A1, | A2, | A1*, | A2*, ... | | |
| Shared_buffer | | A1, | B1, | A1*, | B1*, ... | | |

-continued

| Time stamp | 1, | 2, | 3, | 4, | 5, | 6, | 7, ... |
|---|---|---|---|---|---|---|---|
| Input_B | | B1, | B2, | B1*, | B2*, ... | | |
| Input_B_delayed | | | B1, | B2, | B1*, | B2*, ... | |
| Output A | | | a1, | a2, | a1*, | a2*, ... | |
| Output B | | | | b1, | b2, | b1*, | b2*, ... |
| CM used by Path | | A, | B, | A, | B, ... | | |

The above example shows how one of the three complex multipliers (denoted as "CM" above) is shared between two paths (in this case, paths A and B). The above example also demonstrates how a buffer can be shared between two paths. These instances of sharing allow the preprocessing to be performed without requiring additional data path elements beyond those needed for Radix-4.

Figure 10:
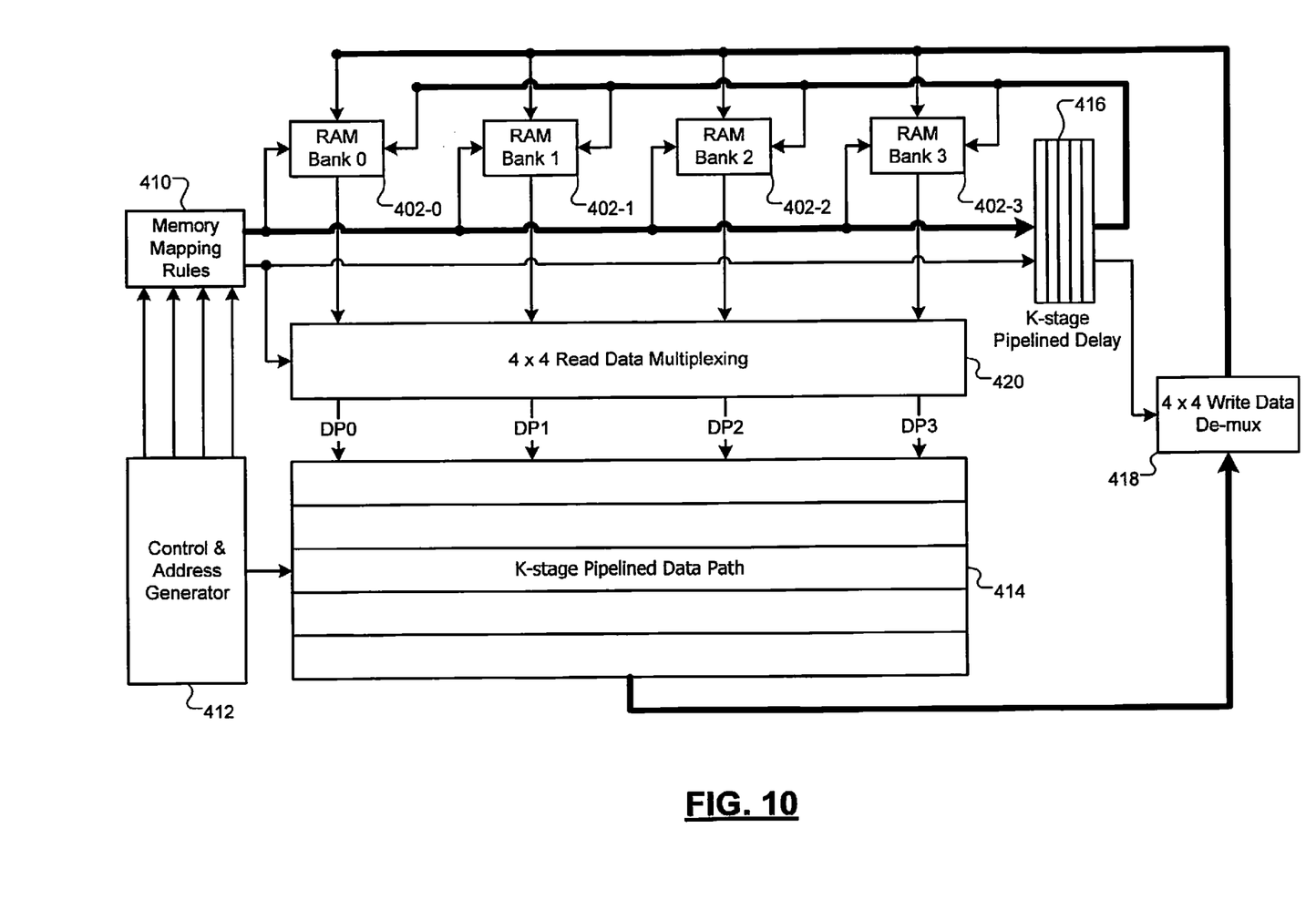
FIG. 10 is a functional block diagram of a system for processing and calculating a transform of a sequence.

Referring now to FIG. 10, a block diagram of a transform calculator according to the principles of the present invention is presented. An N-point sequence is loaded into a group (four in this case) of RAM banks: first RAM bank 402-0, second RAM bank 402-1, third RAM bank 402-2, and fourth RAM bank 402-3. The N-point sequence is apportioned between the four RAM 402 banks by a specified mapping. The specified mapping may be Mapping A of FIG. 5. This mapping is contained within a memory mapping rules module 410.

A control and address generation module 412 simultaneously communicates four addresses to the memory mapping rules module 410. The control module 412 also communicates with a K-stage pipelined data path module 414. The data path module 414 contains buffers and arithmetic functions, including adders and complex multipliers. A pipelined delay module 416 also has K stages. The pipelined delay module stores addresses and multiplexing information from the memory mapping rules module 410. The multiplexing information is communicated to a write data demultiplexing module 418. The memory mapping rules module 410 also communicates multiplexing information to a read data multiplexing module 420.

The read data multiplexing module 420 receives data from each of the four RAM banks 402 and outputs four data values to the data path module 414. These four outputs are named DP0, DP1, DP2, and DP3. The control module 412 generates four addresses of values to be processed by the data path module 414. These four addresses correspond to what the data path module 414 should receive at DP0, DP1, DP2, and DP3. The memory mapping rules module 410 receives these four addresses and, using the specified memory mapping stored within, determines to which of the RAM banks 402 the addresses will be directed. With an appropriate mapping, each of the four addresses will map to a different RAM bank 402.

As an example, if the N-point sequence stored in the RAM banks 402 is a 4096 ($2^{12}$)-point sequence, twelve bits are necessary to select the value. The memory mapping rules module 410 therefore receives four twelve bit addresses. The memory mapping rules module 410 then determines which RAM bank 402 should receive the address. Assuming that the RAM banks 402 are equal in size, each bank will only contain 1,024 ($2^{10}$) values. Therefore, when the memory mapping rules module 410 communicates an address to a RAM bank 402, it only needs to communicate 10 bits. The address bus leaving the memory mapping rules module 410 is then 40 bits wide, 10 bits for each RAM bank 402.

The values selected by the received addresses in the RAM banks 402 are each communicated to the read data multiplexing module 420. The multiplexing module 420 is necessary because while the four correct values have been read from the RAM banks 402, they may not be in the correct order for the data path module 414.

In other words, the value selected from the first RAM bank 402-0 may be required at DP1, not DP0. The multiplexing module 420 therefore acts as a 4-by-4 cross-bar to direct the four inputs from the RAM banks 402 to the appropriate DP inputs of the data path module 414.

When values are written back to the RAM banks 402 (a process called in-place computation) the multiplexing operation must be reversed. The write data demultiplexing module 418 therefore performs the complementary demultiplexing operation on data received from the pipelined data path module 414. Because both the data path module and the pipelined delay module have K stages, the stored multiplexing information will arrive at the demultiplexing module 418 at the same time that data arrives from the data path module 414. Likewise, the pipelined delay module 416 will output the corresponding addresses to the write input of the RAM banks 402 as data is arriving from the demultiplexing module 418.

Figure 11:
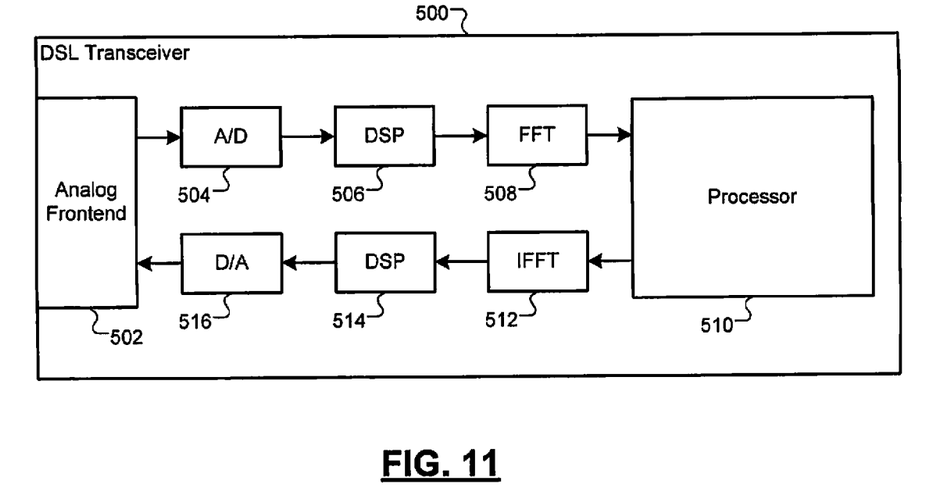
FIG. 11 is a functional block diagram of an exemplary DSL transceiver according to the principles of the present invention.

Referring now to FIG. 11, a functional block diagram of an exemplary Digital Subscriber Line (DSL) transceiver 500 according to the principles of the present invention is presented. An analog front end 502 communicates with physical media and may perform a number of functions including filtering and noise shaping. An A/D (analog-to-digital) converter 504 communicates with the analog front end 502 and converts incoming signals to digital, which are then communicated to a first DSP 506. After processing by the first DSP 506, data is communicated to an FFT module 508, and the output of the FFT module 508 is communicated to a processor 510. On the transmit side of the DSL transceiver 500, processor 510 communicates data to an IFFT module 512, whose output is communicated to a second DSP 514. The output of the DSP 514 is converted to analog by a D/A (digital-to-analog) converter 516, and the analog signal is communicated to physical media by the analog front end 502. The FFT and IFFT modules 508 and 512 may be implemented according to the principles of the present invention to reduce computation time and power demands.

Figure 12A:
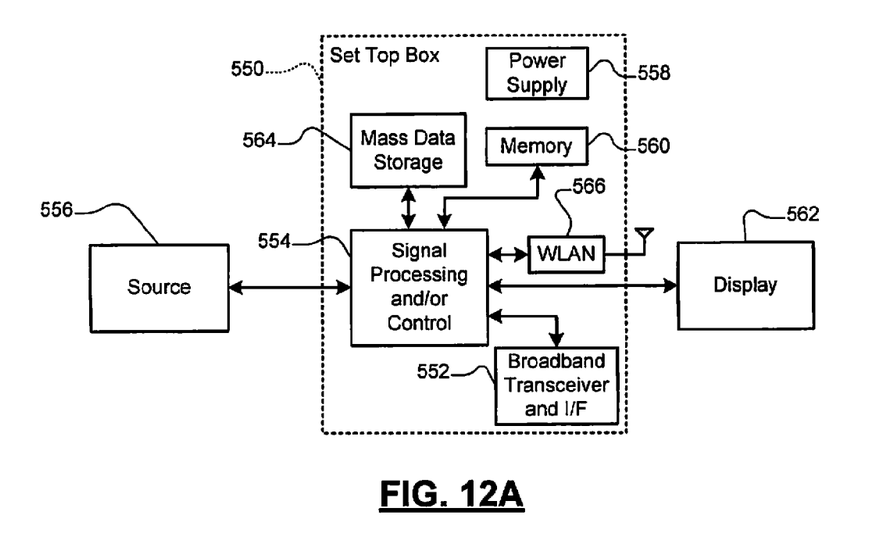
FIG. 12A is a functional block diagram of a set top box employing a broadband transceiver and interface according to the principles of the present invention.

Referring now to FIG. 12A, a device according to the principles of the present invention may be implemented in a set top box 550. The set top box 550 includes a broadband transceiver and interface 552 such as but not limited to a DSL transceiver. Part or all of the broadband transceiver and interface 552 may be implemented in either or both of signal processing and/or control circuits, which are identified generally at 554. The set top box 550 receives signals from a source 556, such as cable, broadcast, and/or satellite. Alternatively, broadband access afforded by the broadband transceiver and interface 552 may serve as the source of content. The signal processing and/or control circuits 554 and/or other circuits (not shown) of the set top box 550 may process data, perform coding and/or encryption, perform calculations, format data, and/or perform any other set top box function.

The set top box 550 contains a power supply 558 and may also include memory 560 such as RAM, ROM, low latency non-volatile memory such as flash memory, and/or other suitable electronic data storage. The set top box 550 generates video and/or audio signals for communication to a display 562. The signal processing and/or control circuits 554 may communicate with mass storage 564 that stores data in a non-volatile manner. The mass data storage 564 may include optical and/or magnetic storage devices; for example, hard disk drives and/or DVDs. The set top box 550 may also support connections with a Wireless LAN (local area network) via a WLAN network interface 566.

Figure 12B:
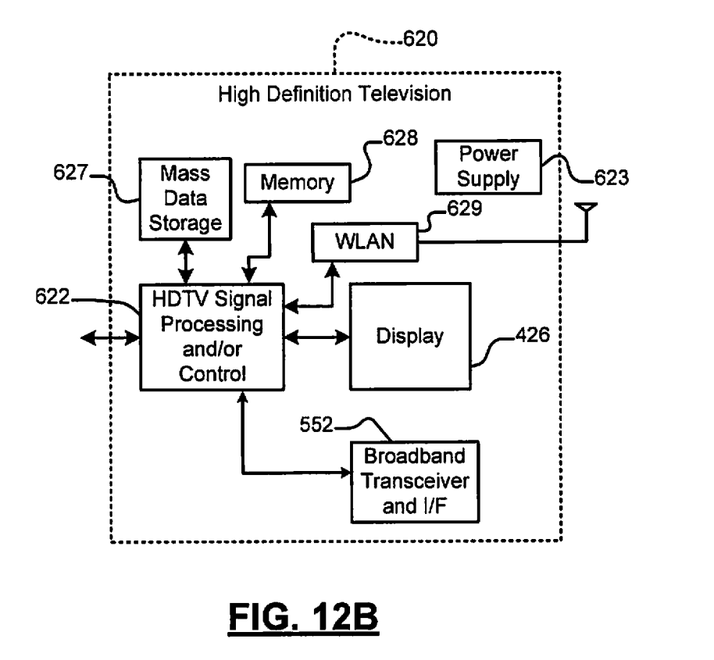
FIG. 12B is a functional block diagram of a high definition television employing a broadband transceiver and interface according to the principles of the present invention.

Referring now to FIG. 12B, the present invention can be implemented in a high definition television (HDTV) 620. The HDTV 620 includes the broadband transceiver and interface 552. Part or all of the broadband transceiver and interface 552 may be implemented in either or both of signal processing and/or control circuits, which are identified generally at 662. The HDTV 620 receives signals from a source, such as cable, broadcast, and/or satellite. Alternatively, broadband access afforded by the broadband transceiver and interface 552 may serve as the source of content. The HDTV may also incorporate the set top box shown in FIG. 12A. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices. The HDD may be a mini HDD that includes one or more platters having a diameter that is smaller than approximately 1.8". The HDTV 620 may be connected to memory 628 such as RAM, ROM, low latency nonvolatile memory such as flash memory and/or other suitable electronic data storage. The HDTV 620 also may support connections with a WLAN via a WLAN network interface 629.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A transform calculator comprising:
a plurality of memories;
a memory mapping rules module configured to apportion points of a discrete time domain sequence among the plurality of memories;
a pipelined data path configured to iteratively process pairs of the points of the discrete time domain sequence received from the plurality of memories; and
a control module configured to select the pairs of the points in the plurality of memories for processing by the pipelined data path,
wherein only one point of each of the pairs of the points is selected at a given time.

2. The transform calculator of claim 1, wherein the plurality of memories consist of four memories.

3. The transform calculator of claim 2, wherein:
each address of the points of the discrete time domain sequence includes L 2-bit quartets;
the memory mapping rules module is configured to sum the L quartets modulo 4; and
the sum is used to select each of the plurality of memories.

4. The transform calculator of claim 1, wherein the pipelined data path is configured to (i) receive pairs of points in parallel for processing and (ii) store the pairs of points in parallel subsequent to processing.

5. The transform calculator of claim 4, wherein the pipelined data path is configured to store the pairs of points at locations in the plurality of memories corresponding from which the pairs were previously received.

6. The transform calculator of claim 1, wherein the memory mapping rules module is configured to distribute the points of the discrete time domain sequence equally among the plurality of memories.

7. The transform calculator of claim 1, wherein the discrete time domain sequence consists of 4096 points.

8. The transform calculator of claim 1, wherein the control module is configured to initiate a transform calculation on the discrete time domain sequence.

9. The transform calculator of claim 8, wherein the pipelined data path is configured to perform the transform calculation.

10. The transform calculator of claim 8, wherein the transform calculation includes a Fast Fourier Transform.

11. The transform calculator of claim 10, wherein the Fast Fourier Transform is performed prior to the iterative processing.

12. The transform calculator of claim 10, wherein the Fast Fourier Transform comprises a Radix-4 technique.

13. The transform calculator of claim 8, wherein the transform calculation includes an inverse Fast Fourier Transform.

14. The transform calculator of claim 13, wherein the inverse Fast Fourier Transform is performed subsequent to the iterative processing.

15. The transform calculator of claim 13, wherein the inverse Fast Fourier Transform comprises a Radix-4 technique.

16. The transform calculator of claim 1, wherein:
each pair of the points comprises a first point and a second point, and
the control module is configured to select a first point of a first pair of the points while designating a second point of a second pair of the points.

17. The transform calculator of claim 16, wherein the pipelined data path includes a complex multiplier that is time-shared between (i) a portion of the pipelined data path processing the first pair and (ii) a portion of the pipelined data path processing the second pair.

18. The transform calculator of claim 16, wherein the plurality of memories is configured to store the discrete time domain sequence as complex values.

19. A transform calculator comprising:
a plurality of memories;
a memory mapping rules module configured to apportion points of an input sequence among the plurality of memories;
a pipelined data path configured to
receive an input from each of the plurality of memories, store an output to each of the plurality of memories, and iteratively process pairs of the points of the input sequence; and
a control module configured to perform a Fast Fourier Transform calculation or an inverse Fast Fourier Transform calculation by
selecting the pairs of the points in the plurality of memories for processing by the pipelined data path, wherein only one point of each of the pairs of the points is selected at a given time.

* * * * *